US005437397A

United States Patent [19]

Fuchs

[11] Patent Number: 5,437,397

[45] Date of Patent: Aug. 1, 1995

[54] MEDIA DISPENSER WITH LOADABLE MEDIUM RESERVOIR

[75] Inventor: Karl-Heinz Fuchs, Radolfzell, Germany

[73] Assignee: Ing. Erich Pfeifer GmbH & Co. KG, Germany

[21] Appl. No.: 97,969

[22] Filed: Jul. 26, 1993

Related U.S. Application Data

[63] Continuation of Ser. No. 766,036, Sep. 26, 1991, abandoned.

[30] Foreign Application Priority Data

Sep. 27, 1990 [DE] Germany ........................ 40 30 531.7

[51] Int. Cl.[6] ........................................ G01F 11/10

[52] U.S. Cl. ........................ 222/321.9; 222/326; 222/386

[58] Field of Search ............... 222/319, 320, 321, 325, 222/326, 386

[56] References Cited

U.S. PATENT DOCUMENTS

| | | | |
|---|---|---|---|
| 2,461,211 | 2/1949 | Guthrie | 222/326 |
| 3,802,608 | 4/1974 | Gullet | 222/309 |
| 4,175,704 | 11/1979 | Cohen | 222/321 X |
| 4,185,628 | 1/1980 | Kopfer | 222/386 X |
| 4,308,977 | 1/1982 | Sigmund et al. | 202/320 |
| 5,044,525 | 9/1991 | McKinney | 222/326 |

FOREIGN PATENT DOCUMENTS

| | | | |
|---|---|---|---|
| 0311863 | 4/1989 | European Pat. Off. | 222/386 |
| 0327757 | 8/1989 | European Pat. Off. | 222/386 |
| 1036149 | 9/1953 | France . | |
| 2625981 | 7/1989 | France | 222/386 |
| 7901055 | 1/1979 | Germany . | |
| 3608955 | 10/1987 | Germany . | |

*Primary Examiner*—Andres Kashnikow
*Assistant Examiner*—Joseph A. Kaufman
*Attorney, Agent, or Firm*—Quarles & Brady

[57] ABSTRACT

A medium reservoir (10) can be inserted from the outside through an insertion opening (24) into the substantially closed casing (6) of a discharge apparatus (1) comprising two actuating units (4, 5) displaceable against one another and can be secured by a mounting support (20) with a snap connection (27) in such a way that it is located in its operating position. Thus, all the components of the discharge apparatus (1) can be preassembled. Subsequently the filled medium reservoir 910) is inserted in an automated operation and through the introduction of a pump piston (11) it can be simultaneously closed or connected to a discharge opening (14).

45 Claims, 1 Drawing Sheet

FIG. 3
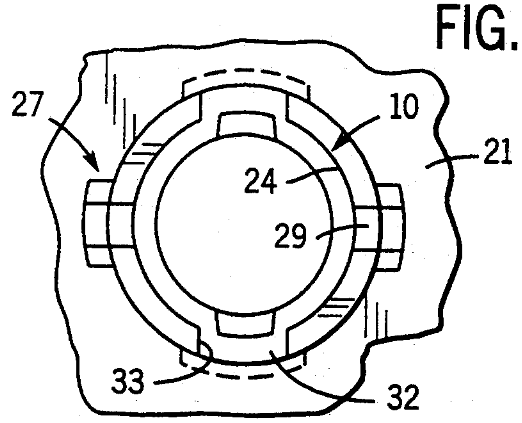
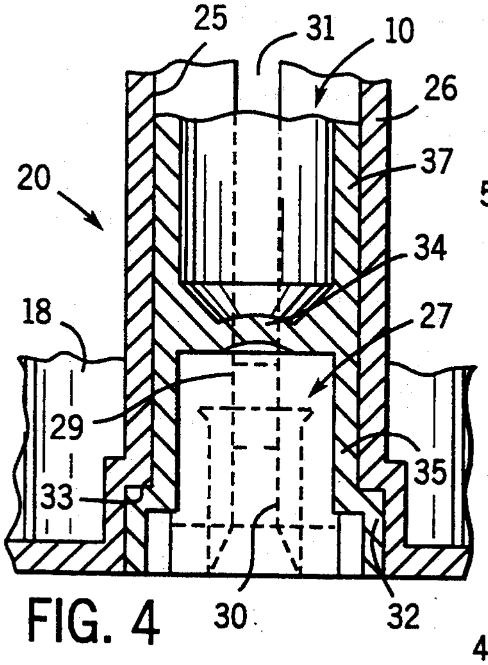
FIG. 4
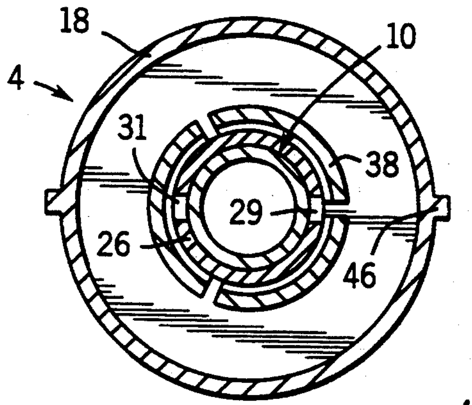
FIG. 2
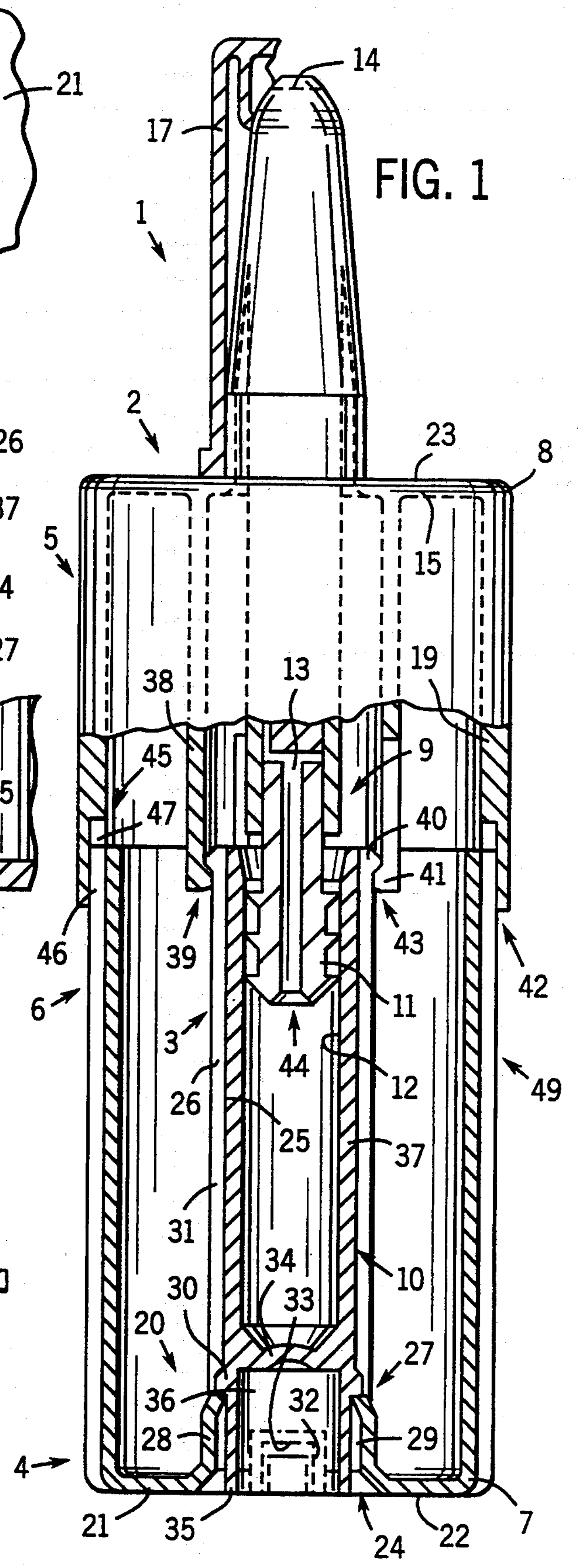
FIG. 1

MEDIA DISPENSER WITH LOADABLE MEDIUM RESERVOIR

This is a continuation of application Ser. No. 07/766,036 filed Sep. 26, 1991 now abandoned.

BACKGROUND OF THE INVENTION

The invention relates to a discharge apparatus for media, in which by manual actuation, e.g. by finger pressure on remote pressure surfaces, one or more discharge feeders are so actuated that a specific medium quantity is pressed out of one or more medium reservoirs or a discharge feeder through an outlet channel to a discharge opening and from there into the open. Particularly in the case of relatively small or slender medium reservoirs, which are only as thick as a pencil, it is appropriate to provide separate components or actuating units for the handles to be moved against one another over the feed stroke, so as to provide ergonomically sufficiently large handles. In this case the medium reservoir is appropriately partly or substantially completely surrounded within at least one of the actuating units. However, to be able to fit the medium reservoir, at least the associated actuating unit must be opened, or released from the other actuating unit. Only then can the actuating units be assembled. Independently of whether the medium reservoir is inserted during the manufacture of the discharge apparatus or only subsequently by the user, this assembly or fitting procedure is complicated, time-consuming and subject to errors.

OBJECTS OF THE INVENTION

An object of the invention is to provide a discharge apparatus of the aforementioned type, which avoids disadvantages of known constructions and which in particular ensures a very easy assembly of the medium reservoir. Other objects will be apparent from the effects and advantages described in the specification.

SUMMARY OF THE INVENTION

These objects are solved by the invention. The features of the invention provide numerous advantageous solution possibilities. According to the invention the discharge actuating means with the two areas to be moved against one another over the actuating stroke forms a pre-assembled unit, which is in one piece or can be formed from separate components, which can be produced or assembled as a subassembly before the medium reservoir is inserted. For inserting the medium reservoir this subassembly has one or more mounting supports accessible from the outside of the dispenser in which the said reservoir can be subsequently inserted at any time in such away that it is in the operating position, e.g. already connected to the discharge feeder or outlet channel or can be transferred into this position by an operating or indexing movement. Thus, the inventive construction is particularly suitable for automated manufacture, because, other than for the arrangement of the medium reservoir, the discharge apparatus is completely prefabricated and can then be inserted and secured in position in a single assembly movement and without separate fastening parts with respect to the previously filled medium reservoir.

Instead of arranging and constructing the medium reservoir in such a way that it is to be connected to a suction opening of the discharge feeder, the medium reservoir appropriately forms a component of the discharge feeder, namely in addition to its storage function, e.g. an elastic, but preferably dimensionally stable pressure or pump chamber, whose chamber volume is reduced by actuation. The stored medium can then be successively pressed out in dosed quantities by stop-limited partial strokes or all at once in a single actuating stroke.

Appropriately the discharge actuating means forms a substantially closed, e.g. approximately cylindrical casing on the circumference and/or on one or both ends and which has at one end or side the discharge opening and at another, particularly remote side an insertion opening for the medium reservoir, which has a much smaller cross-section compared with the surface extension of this side, so that the boundaries of the insertion opening and/or an end portion of the medium reservoir in the vicinity of said opening can form an actuating handle or pressure surface. The insertion opening can be partly or completely closed by the inserted medium reservoir without using additional means.

At a front end in the insertion direction, during insertion the medium reservoir can be opened to a width, which substantially corresponds to its remaining internal width or diameter. On inserting into the subassembly the open end of the filled medium reservoir is closed by an engagement member provided on the subassembly, which forms a pump piston or an additional guide or centering of the actuating units and the medium reservoir relative to one another. Prior to inserting the medium reservoir the actuating units are positionally secured on one another by at least one further guide. A guide can be formed by cap jackets of the actuating units engaging over one another or by sleeves engaging over one another, which are spaced within the outer jacket of the subassembly, said additional guides surrounding in spaced manner on the outer circumference the engagement member or the medium reservoir. The two actuating units are appropriately positively secured against removal by stops, whereby the latter can form a snap connection, which automatically engages on assembly of the two actuating units.

The medium reservoir is appropriately also fixed by an approximately linear plugging movement, which can be roughly equidirectional or parallel to the plugging movement with which the actuating units are assembled. For the positional fixing of the medium reservoir, there is advantageously a separate snap connection from that located between the actuating units and/or is axially spaced from one another and which only fixes the medium reservoir relative to one of the two actuating units, appropriately in clearance-free manner and both in and counter to the insertion direction. This snap connection can also automatically engage by a corresponding resilient construction on inserting the medium reservoir. To facilitate the installation of the medium reservoir, sloping insertion surfaces can be provided for the locking members and/or the reservoir circumference and which are appropriately substantially only fitted in the marginal area of the insertion opening, so that on the outer circumference the medium reservoir can have constant cross-sections over its entire length. The corresponding snap connections can also prevent the medium reservoir from turning.

During insertion the medium reservoir can be particularly securely held if at its rear end it has a gripper member with respect to which it is precisely aligned with an e.g. mandrel-shaped gripper and can be received in substantially clearance-free manner. This gripper member, which can be formed by an extension of the sleeve jacket of the medium reservoir projecting freely over its bottom wall, is appropriately constructed in one piece with the remaining medium reservoir and has stops or snap members of the snap connection. The remaining longitudinal portion of the medium reservoir can be supported with respect to the associated actuating unit on the outer circumference, optionally with radial pretension, so that the medium reservoir is protected against deformation under the discharge pressures which occur, even when constructed with a relatively thin wall.

BRIEF FIGURE DESCRIPTION

These and other features can be gathered from the claims, description and drawings and the individual features, both singly and in the form of subcombinations, can be realized in an embodiment of the invention and in other fields and represent advantageous, independently protectable constructions for which protection is hereby claimed. An embodiment of the invention is described in greater detail hereinafter relative to the drawings, wherein show:

FIG. 1 an inventive discharge apparatus, partly in axial section.

FIG. 2 a cross-section through the discharge apparatus according to FIG. 1, but with the pump piston removed.

FIG. 3 a detail view of the underside of the discharge apparatus of FIG. 1.

FIG. 4 a detail according to FIG. 3 in axial section, but turned by 90°.

DETAILED DESCRIPTION OF A PREFERRED EXAMPLE EMBODIMENT

The discharge apparatus 1 has a compressible discharge actuating means 2 for a discharge feeder 3 completely located therein and with two substantially dimensionally stable actuating units 4, 5, which form a closed casing 6. For this purpose each actuating unit 4 or 5 forms a cap 7 or 8 and the caps are assembled together. The discharge feeder 3 completely located within the casing 6 can have one or more pumps, medium reservoirs 10, pump pistons 11, outlet channels 13 and/or discharge openings 14, e.g. in such a way that a pump piston 11 can successively be introduced into a plurality of medium reservoirs 10, which are arranged in a ring in the manner of a turret arrangement.

However, in the represented embodiments said parts are only provided singly and are substantially located within a common axis and completely within the casing 6. Over the end wall 15 of the cap 8, which is wider roughly by twice the wall thickness, project outwards a discharge connection 16 located in said central axis and which in the vicinity of its free end has the discharge opening 14 and with the latter can be covered by a removable screw cap 17, which can be prefitted independently of the medium reservoir 10. The jacket 18 of the other cap 7 having substantially constant cross-sections over its length engages closely with its open end in the inner circumference of the jacket 19 of the cap 8, which also has approximately constant cross-sections over its length. Thus, the two actuating units 4, 5 can be moved against one another by finger pressure of one hand approximately up to the abutment of the inner open face of the cap 7 on the inside of the end wall 15 of the cap 8. For fixing the medium reservoir 10 within the casing 6 and in contact-free manner with respect to the cap jackets 18, 19 is provided a mounting support 20, which projects substantially freely from the end wall 21 of the cap 7 into the casing 6 and with its free end can extend approximately into the plane of the open face of the cap jacket 18. The outside of the end wall 21 forms an actuating member 22 of the discharge actuating means 2 and the mounting support 20 does not project outwards over the pressure surface forming this actuating member 2 and instead terminates substantially flush therewith. The other actuating member 23 is formed by the remote face of the end wall 15and arranged in circular manner around the discharge connection 16. The mounting support 20 is accessible through an insertion opening 24 traversing the end wall 21 and whose boundary is located in radial spacing within the outer or inner circumference of the jacket of the casing 6 and which is formed by the associated end of a support shaft 25. The latter is formed by the inner circumference of a sleeve 26 constructed in one piece with end wall 21 and projecting freely inwards therefrom. The sleeve is closely adapted to the outer circumference of the medium reservoir 10 and receives the latter substantially over its entire length.

In the vicinity of a portion connected to the end wall 21 between the medium reservoir 10 and the sleeve 26 is provided a snap connection 27, which engages if the medium reservoir 10 is inserted through the insertion opening 24 and reaches its installation position. For this purpose the jacket of the sleeve 26 following on to the end wall 21 forms radially outwardly projecting projections 28 at two or more circumferentially distributed points and which on their insides bound facing longitudinal grooves 29 for the displaceable reception of the snap cams 30, which project at the most by the wall thickness of the sleeve 26 over the outer circumference of the medium reservoir 10 and are constructed in one piece with the latter. Following on to the outer face of the endwall 21, the grooves 29 have insertion bevels, with which are associated correspondingly sloping end faces on the front ends of the snap cams 30. The inner ends of the grooves 29 are substantially closed by corresponding sloping faces, but can be resiliently pressed far enough apart through the sloping end faces of the snap cams 30 for the latter to pass over them and then lock behind the inner end faces of the projections 28. Each snap cam 30 is then located in the associated end of a longitudinal slot 31 of the jacket of the sleeve 26, said slot 31 passing through to the free end of the sleeve 26. The slot 31 is connected to the end face of said projection 28, in whose vicinity the sleeve 26 is closed over the circumference and which forms a rotation preventing means for the medium reservoir 10.

The insertion movement of the medium reservoir 10 is bounded by two stops 32 projecting in facing manner and in one piece over the outer circumference of the medium reservoir 10 and which are circumferentially displaced with respect to the snap cam 30. The stops 32 engage in pockets 33 on the inner circumference of the sleeve 26 or the insertion opening 24 and also form a rotation prevention means. The stops 32 strike on the bottom faces of the pockets 33 at the instant when the snap cams 30 arrive in the locked position, so that then the medium reservoir 10 can be positively and non-detachably secured in the two opposite directions. A detachable connection with the actuating unit 4 is conceivable for an interchangeable arrangement of the medium reservoir 10. The snap cams 30 are axially directly adjacent to a bottomwall 34 in one piece with the reservoir and namely on an extension of the jacket 37 of the reservoir 10projecting over its outside. This sleeve-like extension 35 forms an open gripper member 36 at the rear end of the medium reservoir 10 for the central reception of the latter with a suitable gripper and in the installation position is completely within the insertion opening 34. Stops 32 are also provided at the end of said extension 35. As a result of the described position the snap cams 30 are securely supported against relative movements with respect to the jacket 37.

Roughly from the bottom wall 34 to the open, slightly funnel-shaped, widened end, the inner circumference of the medium reservoir 10 forms a cylinder running path 12 for the pump piston 11, which is fixed to the end of a ram projecting freely over the inside of the end wall 15 and constructed in one piece with the actuating unit 5 through the insertion of a piston shaft. The pump piston 11 projects over the open face of the cap jacket 19. On inserting the medium reservoir 10 into the preassembled actuating units 4, 5, before reaching the assembly position, the pump piston 11 passes into the open end of the running path 12, so that the pump chamber formed by the interior of the medium reservoir 10 is closed and connected to the outlet channel 13 emanating from the inner end face of the pump piston 11 and via said channel to the discharge opening 14.

Prior to the installation of the medium reservoir 10 the two actuating units 4, 5 are secured against one another to prevent axial drawing apart and rotation by at least one snap connection 39 and at least one guide 42, 43. One guide 42 is formed by the two interengaging cap jackets 18, 19. A further sleeve 38 projects freely inwards in spaced manner within the cap jacket 19 from the end wall 15 of the cap 8 and forms with the sleeve 26 the further guide 43 and the snap connection 39. The sleeve 38 in one piece with the actuating unit 5 has for this purpose in the vicinity of the free end at least one radially inwardly projecting, cam-like snap member 41 and is subdivided by longitudinal slots into at least two or three circumferentially adjacent shell segments, which can be resiliently spread apart and in each case have a correspondingly segmental snap member 41. In the vicinity of the free end the sleeve 26 has a corresponding, radially outwardly projecting, collar-like snap member 40. After inserting the pump piston 11 in the medium reservoir 10, the snap members 40, 41 run on one another, so that the snap members 41 are widened until they resiliently engage behind the snap members 40, which leads to an axially positive securing effect. The snap members 41 can simultaneously slide on the outer circumference of the sleeve 26. The pump piston 11 forms a further engagement member 44 for the reciprocally supporting connection of the two actuating units 4, 5. If this engagement member 44 is not a pump piston, it substantially only serves to close or connect the medium reservoir 10 on insertion. The engagement member 44 projects over the free end of the sleeve 33, which in turn extends approximately to the free end of the cap jacket 19 or is set back slightly with respect thereto.

In the represented case the actuating units 4, 5, after performing a pump stroke, are not moved back by a spring to their starting position and instead the axial pump stroke end position is simultaneously the axial starting position for the following pump stroke, so that there is a stepwise penetration of the pump piston 11 into the pump chamber. Each pump stroke is stop-limited by a control 45, which is e.g. formed by cam webs 46 on the outer circumference of the cap jacket 18 and stepped cam grooves 47 on the inner circumference of the cap jacket 19. At the end of each pump stroke the two actuating units 4, 5 are so rotated relative to one another that the cam webs 46 can engage with the next, longer cam grooves 47. Thus, said control 45 and optionally a display means for discharge processes forms part of the preassembled unit 49, in which the medium reservoir 10 can be subsequently inserted.

What is claimed is:

1. A dispenser for media discharging comprising:

at least one discharge actuating means (2);

at least one discharge feeder (3) having at least two actuating units (4, 5) movable against one another via an actuating stroke, said actuating units (4, 5) forming a preassembled common unit (49);

at least one medium reservoir (10) transferable from a dismounted state separate from and outside of said common unit (49) to amounted state operationally connected to said common unit (49) in a discharge position;

at least one mounting support (20) for mountingly receiving said at least one medium reservoir in said discharge position; and means for permitting insertion of said at least one medium reservoir (10) into said preassembled common unit (49) from a location apart from said preassembled common unit after assembly of said common unit (49) in said discharge position without disassembly of said common unit (49).

2. The dispenser according to claim 1, wherein said mounting support (20) for said at least one medium reservoir (10) is provided substantially only on one of said actuating units (4, 5).

3. The dispenser according to claim 1, wherein said mounting support receives said at least one medium reservoir substantially free of motion play.

4. The dispenser according to claim 1, wherein one of said actuating units (5) has at least one engagement member (44) for directly and displaceably engaging said medium reservoir (10).

5. The dispenser according to claim 4, wherein said engagement member (44) provides an outlet duct (13) leading to an opening (14) of said dispenser (1).

6. The dispenser according to claim 1, wherein said at least one medium reservoir (10) bounds a pump chamber of said discharge feeder (3).

7. The dispenser according to claim 1, wherein said medium reservoir has a chamber opening, one of said actuating units (5) having an engagement member (44) for closing said chamber opening of said medium reservoir (10) by inserting into said mounting support (20), said medium reservoir having a unitary, closed end at a distance from said chamber opening.

8. The dispenser according to claim 7, wherein said engagement member (44) provides a pump piston (11) of a thrust piston pump (9) displaceably engaging an interior of said medium reservoir (10); said engagement member (44) being positioned at an end of a piston rod provided on said actuating unit (5) and freely projecting into said common unit (49).

9. The dispenser according to claim 7, wherein said engagement member (44) provides an outlet duct (13) leading to an opening (14) of said dispenser (1).

10. The dispenser according to claim 1, wherein said at least one medium reservoir (10) forms a pump cylinder extending substantially an entire length extension of said medium reservoir.

11. The dispenser according to claim 1, wherein, prior to said insertion, said common unit (49) forms a substantially closed casing (6) and said actuating units are two relatively displaceably interengaging casing caps (7, 8), said casing caps (7, 8) commonly being said casing (6); said casing (6) having an outer wall (21) providing at least one insertion opening (24) in said outer wall (21) for insertingly receiving said medium reservoir (10) after said casing caps (7, 8) are assembled to provide said closed casing (6).

12. The dispenser according to claim 11, wherein, in said discharge position, said at least one medium reservoir (10) is substantially completely countersunk within said casing (6).

13. The dispenser according to claim 11, wherein a boundary of said insertion opening (24) provides at least part of said mounting support (20) provided for an end of said medium reservoir (10).

14. The dispenser according to claim 11, wherein said medium reservoir (10) provides a substantially tight closure of said insertion opening (24).

15. The dispenser according to claim 1, wherein said mounting support (20) provides a support shaft (25) supportingly engaging an outside of said medium reservoir (10) over substantially an entire length extension of said medium reservoir (10), an insertion opening (24) for inserting said medium reservoir (10) being provided in an end wall (21) connecting to said support shaft (25).

16. The dispenser according to claim 15, wherein said medium reservoir (10) provides a substantially tight closure of said insertion opening (24).

17. The dispenser according to claim 1, wherein said mounting support (20) positively receives said at least one medium reservoir along a longitudinal direction and a circumferential direction of said medium reservoir.

18. The dispenser according to claim 1, wherein said mounting support (20) exclusively forms a self-locking plug connector for said medium reservoir (10).

19. The dispenser according to claim 1, wherein said at least one mounting support (20) provides a snap connector (27) for locking said medium reservoir (10) in said discharge position, said snap connector (27) rigidly connecting said medium reservoir (10) to one of said actuating units (4).

20. The dispenser according to claim 19, wherein said snap connector (27) is located in the vicinity of a bottom end of said medium reservoir (10), said bottom end being provided remote from an open end of said medium reservoir (10).

21. The dispenser according to claim 1, wherein, in said discharge position, said medium reservoir is locked against movements in an insertion direction by stops (32) of said medium reservoir engaging in pockets (33) of said mounting support and against movements counter to said insertion direction by snap cams (30) of said medium reservoir engaging behind locking shoulders of said mounting support.

22. The dispenser according to claim 1, wherein at least one of members provided by:

said at least one medium reservoir (10); and said at least one mounting support (20) is spacedly surrounded by a jacket of said common unit (49).

23. The dispenser according to claim 1, wherein said medium reservoir has an outer circumference and a length extension, said medium reservoir (10) being supported with respect to one of said actuating units (4) on said outer circumference and over most of said length extension, said mounting support (20) providing a longitudinally slotted sleeve (26) engaging said medium reservoir (10).

24. The dispenser according to claim 1, wherein said actuating units (4, 5) are guided on one another with at least two spacedly separate guides (42, 43)located substantially one in the other.

25. The dispenser according to claim 1, wherein said actuating units (4, 5) are cap jackets (18, 19) having guide sleeves (26, 38), said guide sleeves interengaging inside said cap jackets, one of said guide sleeves (26) forming a support shaft (25) of said mounting support (20) open at remote ends and providing a receptacle for said medium reservoir (10).

26. The dispenser according to claim 1, wherein independently from said medium reservoir (10), said actuating units (4, 5) are positively secured with respect to each other against separation.

27. The dispenser according to claim 26, wherein said actuating units (4, 5) are prevented from mutual separation by a self-locking snap connection (39).

28. The dispenser according to claim 27, wherein said actuating units (4, 5) provide guide sleeves (26, 38) having freely projecting ends,said ends providing snap members (40, 41) of said snap connection (39), said snap members forming separable fixing stops for preventing separation of said actuating units.

29. The dispenser according to claim 1, wherein said at least one medium reservoir (10) has at least one gripper member (36) for positively and separately receiving an assembly gripper of a device for assembling the medium reservoir to the mounting support.

30. The dispenser according to claim 29, wherein said gripper member (36) is provided by sleeve-like hollow extension (35) connecting to a bottom wall (34) at an end of said medium reservoir (10).

31. A dispenser for discharging media according to claim 1, further comprising said at least one medium reservoir (10) having an opening and being separate from said actuating units (4, 5); and closing means for closing said opening of said medium reservoir (10) prior to substantially rigidly connecting said medium reservoir (10) to one of said actuating units (4).

32. The dispenser according to claim 31, further comprising at least one piston pump having at least one pump piston (11) connected to said actuating units, said closing means including said pump piston (11) provided for engaging and closing the opening of said medium reservoir (10) prior to mutually reaching said initial connected state by said actuating units (4, 5) and said medium reservoir (10).

33. The dispenser according to claim 31, wherein said medium reservoir (10) is prefilled with the medium prior to closing with said closing means.

34. A dispenser for discharging media comprising:

at least one discharge actuating means (5);

at least two actuating units (4, 5) connected and operationally moveable with respect to one another from an initial state over an actuating stroke, said actuating units (4, 5) having outer walls and having mutually interengaging members (40, 41 or 46, 47) providing at least one engagement pair, wherein said interengaging members (40, 41) of said engagement pair (40, 41 or 46, 47) are held in assembly together by at least one snap connection (39) that is spaced inwardly from said outer walls of said actuating units (4, 5), said interengaging members(40, 41) remaining operationally moveable in at least one direction with respect to one another while being held in assembly through said snap connection.

35. The dispenser according to claim 34, wherein said at least one snap connection (39) is assembled by a linear snap motion, at least one medium reservoir (10) being provided, inserting means being provided for permitting insertion of said medium reservoir (10) from outside of said dispenser (1) to inside at least one of said actuating units (4) substantially parallel to said linear snap motion.

36. The dispenser according to claim 34, wherein said interengaging members are sleeves (26, 38), said sleeves freely projecting and mutually interengaging for discharging the media, said sleeves (26, 38) being operationally displaceable over said actuating stroke of said dispenser (1).

37. The dispenser according to claim 34, wherein at least one slide guide (42, 43) is provided for mutually guiding said actuating units (4, 5) over said actuating stroke, said snap connection (39)providing said slide guide (43).

38. The dispenser according to claim 37, wherein a second slide guide (42) separate from said snap connection (39) is provided.

39. The dispenser according to claim 34, wherein said snap connection (39) is provided for mutually securing said actuating units (4, 5) against disassembly and relative rotation.

40. The dispenser according to claim 34, wherein said snap connection (39) provides at least one resilient shell-segmental snap member (41);and a collar-shaped counter member (40).

41. A dispenser for discharging media comprising:

at least one discharge actuating means (5);

at least two actuating units (4, 5) connected and operationally displaceable with respect to one another from an initial state over an actuating stroke, said actuating units (4, 5) having outer walls and having mutually interengaging members (40, 41 or 46, 47) providing at least one engagement pair, wherein said interengaging members (40, 41) of said engagement pair (40, 41 or 46, 47) operationally moveably interengage through at least one snap connection (39) that is spaced inwardly from said outer walls of said actuating units (4, 5) wherein said snap connection (39) is provided by at least one radially inwardly projecting snap member (41) and at least one radially inwardly projecting snap member (41) and at least one radially outwardly projecting counter member (40), displaceable with respect to each other over said actuating stroke, said actuating stroke actuating discharge of the media.

42. A dispenser for discharging media comprising:

at least one discharge actuating means (5);

at least two actuating units(4, 5) connected and operationally displaceable with respect to one another from an initial state over an actuating stroke;and at least one medium reservoir (10) separate from said actuating units (4, 5), wherein at least one holding shaft (25) is provided for insertingly receiving and positionally securing said medium reservoir (10), said holding shaft (25) providing at least one snap member (30, 40) of at least one snap connection (27, 29) provided for mutually interengaging said holding shaft (25) with said medium reservoir (10) and said actuating units(4, 5) in said initial state.

43. The dispenser according to claim 42, wherein at least one of said actuating units (4, 5) has at least one jacket (18, 19) spacedly enveloping said at least one snap connection (27, 29), said at least one holding shaft (25) and said at least one medium reservoir (10).

44. The dispenser for discharging media comprising:

at least one discharge actuating means (5);

at least two actuating units (4, 5) connected and operationally displaceable with respect to one another from an initial state over an actuating stroke; and at least one medium reservoir (10) inserted into a reservoir holder (26), wherein said medium reservoir (10) has a bottomwall (34) providing a bottom outside and an extension (35) projecting past said bottom outside, said extension having an extension end, at least one stop member (32) being provided for limiting an insertion motion of said medium reservoir (10) when being inserted in said reservoir holder (26), said stop member (32) being located in the vicinity of said extension end, said actuating unit (4, 5) having an end wall (21, 15) providing at least one external actuating pressure face (22, 23), said reservoir holder (25) substantially connecting to said pressure face (22).

45. A dispenser for media discharging comprising:

at least one discharge actuating means (2); at least one medium reservoir (10) separate from said discharge actuating means, said medium reservoir (10) providing a reservoir jacket (37) and a reservoir bottom (34) rigidly connected to said reservoir jacket (37), wherein said medium reservoir (10) has an extension (35) externally projecting from said bottomwall (34) and rigidly connected to said medium reservoir (10), said extension (35) providing connecting means (30, 32) externally of said reservoir bottom (34) for positive connection with counter members (28, 33).

* * * * *

UNITED STATES PATENT AND TRADEMARK OFFICE

CERTIFICATE OF CORRECTION

PATENT NO. : 5,437,397 Page 1 of 2

DATED : August 1, 1995

INVENTOR(S) : Fuchs, Karl-Heinz

It is certified that error appears in the above-identified patent and that said Letters Patent is hereby corrected as shown below:

Item [57]

Line 9 of Abstract, "910)" should be --(10)--.

Column 1, line 47, "pre-assembled" should be --preassembled--.

Column 2, line 14, "cross-section" should be --cross section--.

Column 2, line 61, "cross-section" should be --cross section--.

Column 3, line 26, "cross-section" should be --cross section--.

Column 3, line 53, "project" should --projects--.

Column 3, line 59, "cross-sec-" should be --cross sec---.

Column 3, line 62, "cross-sections" should be --cross sections--.

Column 4, line 11, "15and" should be --15 and--.

Column 4, line 68, "bottomwall" should be --bottom wall--.

Column 5, line 2, "10projecting" should be --10 projecting--.

Column 5, line 7, "34" should be --24--.

UNITED STATES PATENT AND TRADEMARK OFFICE

CERTIFICATE OF CORRECTION

PATENT NO. : 5,437,397

DATED : August 1, 1995

INVENTOR(S) : Fuchs, Karl-Heinz

It is certified that error appears in the above-indentified patent and that said Letters Patent is hereby corrected as shown below:

Column 6, line 19, "amounted" should be --a mounted--.

Signed and Sealed this

Seventeenth Day of September, 1996

Attest:

BRUCE LEHMAN

Attesting Officer

*Commissioner of Patents and Trademarks*